US009312750B2

(12) United States Patent
Kwan et al.

(10) Patent No.: US 9,312,750 B2
(45) Date of Patent: Apr. 12, 2016

(54) ELECTRONIC APPARATUS AND CONTROL METHOD FOR HIGH FREQUENCY AC TO DC CONVERSION

(71) Applicant: THE UNIVERSITY OF HONG KONG, Hong Kong (CN)

(72) Inventors: Lee Chi Kwan, Hong Kong (CN); Sitthisak Kiratipongvoot, Hong Kong (CN)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 0 days.

(21) Appl. No.: 14/160,830

(22) Filed: Jan. 22, 2014

(65) Prior Publication Data
US 2015/0207402 A1 Jul. 23, 2015

(51) Int. Cl.
*H02M 1/42* (2007.01)
*H02M 7/06* (2006.01)
*H02J 5/00* (2006.01)

(52) U.S. Cl.
CPC ............. *H02M 1/4266* (2013.01); *H02J 5/005* (2013.01); *H02M 1/4241* (2013.01); *H02M 7/066* (2013.01)

(58) Field of Classification Search
CPC ........... H02M 1/12; H02M 1/14; H02M 1/15; H02M 1/32; H02M 3/3359; H02M 7/06; H02M 7/217; Y02B 70/126; Y02B 70/1475
USPC ................................. 363/44–48, 84, 125–127
See application file for complete search history.

(56) References Cited

U.S. PATENT DOCUMENTS

| 1,119,732 A | | 12/1914 | Tesla | |
|---|---|---|---|---|
| 4,506,195 A | * | 3/1985 | Elms | 315/205 |
| 5,301,095 A | * | 4/1994 | Teramoto et al. | 363/21.07 |
| 2005/0110429 A1 | * | 5/2005 | Poon et al. | 315/244 |
| 2007/0076443 A1 | * | 4/2007 | Yasumura | 363/16 |
| 2012/0250360 A1 | * | 10/2012 | Orr et al. | 363/21.02 |
| 2013/0128638 A1 | * | 5/2013 | Irish | 363/126 |
| 2013/0154372 A1 | * | 6/2013 | Chang et al. | 307/31 |
| 2014/0029318 A1 | * | 1/2014 | Chen et al. | 363/44 |

FOREIGN PATENT DOCUMENTS

WO WO 2015/018334 A 2/2015

OTHER PUBLICATIONS

J. Schuder, H. Stephenson, and J, Townsend, "High-level electromagnetic energy transfer through a dosed chest wall," Inst. Radio Engrs. Int. Conv. Record, vol. 9, pp. 119-126, 1961.
J.C. Schuder, J.H. Gold and H. E. Stephenson, "An inductively Coupled RF System for the Transmission of 1kW of Power Through the Skin", IEEE Transactions on Bio-Medical Engineering, vol. BME-18, issue 4, pp. 265-273, 1971.

(Continued)

*Primary Examiner* — Adolf Berhane
(74) *Attorney, Agent, or Firm* — Leason Ellis LLP.

(57) ABSTRACT

A high-frequency ac-dc power converter takes an input ac signal and converts it to an output dc signal. The converter has at least two front-end rectifier diodes arranged as a full wave rectifier of the input ac signal. A first inductor positioned at the output of the full wave rectifier. An output capacitor is connected across a load for the converter. There are at least one additional inductor and one additional capacitor. A switching circuit selectively forms different (LC) resonant circuits with the inductors and capacitors during a cycle of the input ac signal to form a dc-dc power converter.

10 Claims, 8 Drawing Sheets

(56) References Cited

OTHER PUBLICATIONS

W. Ko, S. Liang, and C. F. Fung, "Design of radio-frequency powered coils for implant instruments," Medical and Biological Engineering and Computing, vol. 15, pp. 634-840, 1977.

E. S. Hochmair, "System Optimization for Improved Accuracy in Transcutaneous Signal and Power Transmission," IEEE Transactions on Biomedical Engineering, vol. BME-31, Issue 2, pp. 177-186, 1984.

H. Matsuki, M. Yamaguchi, T. Watanabe, K. Murakami, et al. "Implantable Transformer for an Artificiai Heart Utilizing Amorphous Magnetic Fibers", Journal of Applied Physics, vol. 64, issue 10, pp. 5859-5861, 1988.

H. Matsuki and M.Shiiki, "Investigation of Coil Geometry for Transcutaneous Energy Transmission for Artificial Heart", IEEE Transactions on Magnetics, Vol, 28, Issue 5, pp. 2406-2408, 1992.

G.A. Covic and J.T Boys,. "inductive Power Transfer", Proceedings of the IEEE, vol. 101 , Issue 6, pp. 1276-1289, 2013.

S.Y. Hui, "Planar Wireless Charging Technology for Portable Electronic Products and Qi", Proceedings of the IEEE, vol. 101, Issue 6, pp. 1290-1301, 2013.

"Qi: the standard for wireless charging", www.wirelesspowerconsortium.com.

J.W. Kim, H.C. Son, K.H. Kim and Y.J. Park, "Efficiency Analysis of Magnetic Resonance Wireless Power Transfer with Intermediate Resonant Coil", IEEE Antennas and Wireless Propagation Letters, vol. 10, pp. 389-392, 2011.

S.C. Moon, B.C. Kim, S.Y. Cho and G.W. Moon, Analysis and design of wireless power transfer system with an intermediate coil for high efficiency, IEEE ECCE Asia, Melbourne, Jun. 3-6, 2013, pp. 1034-1040.

M. Kiani, and M. Ghovanloo, "The circuit theory behind coupled-mode magnetic resonance-based wireless power transmission," IEEE Transaction on Circuits and Systems—I, vol. 59, Issue 8, pp. 1-10, 2012.

S. Chem, Y.H. Kim, S.Y. Kang, M. L. Lee, J.M. Lee, and T. Zyung, "Circuit-model-based analysis of a wireless energy-transfer system via coupled magnetic resonances", IEEE Transaction on Industrial Electronics, vol. 58, Issue 7, pp. 2906-2914, 2011.

Y.H. Kim, S.Y. Kang, S. Chem, M.L. Lee, J.M Lee and T. Zyung, "Optimization of wireless power transmission through resonant coupling", in Proc. CPE'09, pp. 426-431, 2009.

N. Y. Kim, K.Y. Kim, J. Choi and C.W. Kim, "Adaptive frequency with power-level tracking system for efficient magentic resonance wireless power transfer", Electronics Letters, vol. 48, No. 8, Apr. 12, 2012.

N. Mohan, T.M. Undeland and W.P. Robbins, "Power Electronics: Converters, Applications, and Design", 3 rd Edition, pp. 483-494.

C. K. Tse, "Circuit Theory and Design of Power Factor Correction Power Supplies", IEEE Distinguished Lecture 2005, Circuit and Systems, http://cktse.eie.polyu.edu.hk/Tse-IEEElecture2.pdf.

K. Gauen,"The Effect of MOSFET Output Capacitance in High Frequency Applications", in Proc. Industry Applications Society Annual Meeting 1989, vol. 2, pp. 1227-1234, 1989.

M. Hartmann, H. Ertl and J.W. Kolar, "On the Tradeoff Between Input Current Quality and Efficiency of High Switching Frequency PWM Rectifiers", IEEE Transactions on Power Electronics, vol. 27, issue 7, pp. 3137-3140, 2012.

W. Liang, J. Glaser and J. Rivas."13.56 MHz High Density DC-DC Converter with PCB Inductors" in Proc. Applied Power Electronics Conference and Exposition (APEC) 2013, pp. 633-640, 2013.

Z. Chen, D. Boroyevich and J. Li,"Behavioral Comparison of Si and SiC Power MOSFETs for High-Frequency Applications", in Proc. Applied Power Electronics Conference and Exposition (APEC) 2013, pp. 2453-2460, 2013.

J.M. Burkhart, R. Korsunsky and D.J. Perreault, "Design Methodology for a Very High Frequency Resonant Boost Converter", IEEE Transaction on Power Electronics, vol. 28, Issue 4, pp. 1929-1937, 2013.

Zhang, W.; Lee, F. C.; Chen, D. Y.; "Integrated EMI/Thermal design for switching power supplies", in Proc. 31st Annual IEEE PESC '00, Jun. 18-23, 2000, vol. 1, pp. 47-52.

F. C. Lee and J.D. van Wyk, "IPEM-Based Power Electronics System", in Proc. Integrated Power Systems (CIPS) 2006, pp. 1-14, 2006.

Q. Li, M. Lim, J. Sun, A. Ball, Y. Ying, F.C. Lee and K.D.T. Ngo, "Technology Roadmap for High Frequency Integrated DC-DC Converter", in Proc. Power Electronics and Motion Control Conference 2009, pp. 1-8, 2009.

S. Ji, D. Reusch and F.C. Lee, " High-Frequency High Power Density 3-D Integrated Gallium-Nitride-Based Point of Load Module Design", IEEE Transaction on Power Electronics, vol. 28, Issue 9, pp. 4216-4226, 2013.

* cited by examiner

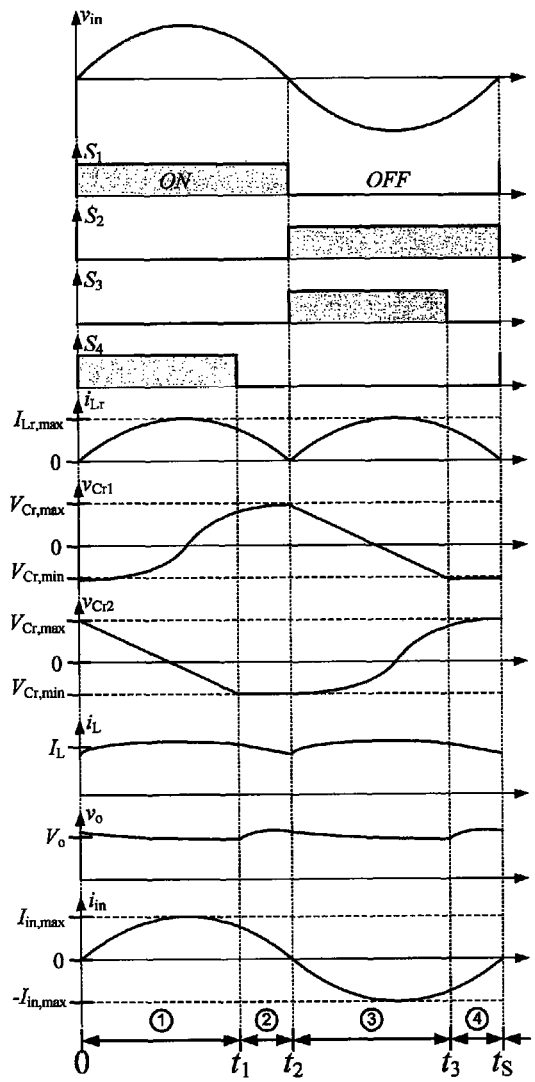
Figure 6(a)
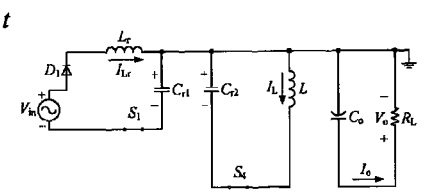
(b) State 1
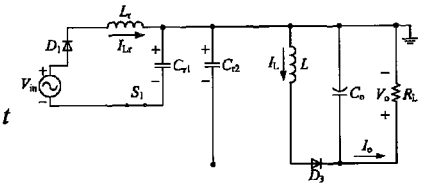
(c) State 2
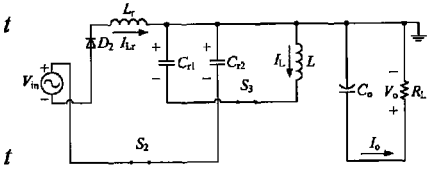
(d) State 3
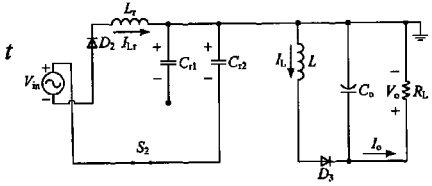
(e) State 4
Figures 6(b)-(e)

ELECTRONIC APPARATUS AND CONTROL METHOD FOR HIGH FREQUENCY AC TO DC CONVERSION

FIELD OF THE INVENTION

The present invention relates generally to high frequency AC to DC conversion for the purpose of wireless power transfer.

BACKGROUND OF THE INVENTION

Wireless power transfer (WPT) based on the magnetic resonance and near-field coupling of two loop resonators was reported by Nicola Tesla a century ago. It transmits electric energy and information from a transmitter to the receiver without physical contact. Since the 1960s, and particularly over the last few decades, WPT has been an active research area in regard to transcutaneous energy systems for medical implants. For modern short-range applications, inductive power transfer (IPT) systems and wireless charging systems for portable electronic equipment have attracted much attention since 1990's and 2000's respectively. Wireless charging technology for portable electronic devices has reached commercialization stage through the launch of the "Qi" Standard by the Wireless Power Consortium, now comprising over 135 companies worldwide. The recent research activities on this topic have focused on mid-range applications comprising 2-coil, 4-coil, relay resonators and domino-resonator systems.

At present, a lot of research is focused on improving the performance of WPT systems, such as to increase the transfer distance, to improve the efficiency and to widen the operating frequency. There is a lack of research examining and addressing the problems arising from the receiver side, which also has a significant influence on the performance and efficiency of the system. In most of the applications, the AC power output from the receiver is first converted to a DC voltage. The simplest approach is to use a diode rectifier 10 with a capacitor 12 connected at the DC output side as shown in FIG. 1(a). However, this capacitor is charged to a value close to the peak of the AC input voltage (see FIG. 1(b)). As a result, the input current is very large near the peak of the AC input voltage and it does not flow continuously. These diode rectifiers draw highly distorted current from the AC source and result in a poor power factor (PF). The energy efficiency and power transfer capability of a poor PF system are relatively low because of the high conduction loss in the power converters and transmission wires. Additionally, the distorted current has rich harmonic content which may create extra electromagnetic interference (EMI) in neighboring electronic equipment.

An electronic power converter, such as a boost converter, can be used to shape the line current drawn by the rectifier so it is sinusoidal and in phase with the line voltage. FIG. 2(a) shows a classical boost converter connected after a diode bridge rectifier to form a power factor correction (PFC) circuit. The output dc voltage $V_{dc\,actual}$ is sensed and fed to an error amplifier 20. The difference $V_{error}$ between the actual and reference voltage $V_{dc\,ref}$ is derived and applied to a compensator circuit 22, such as a proportional-integral (PI) compensator. The output of the compensator is multiplied in circuit 24 with the signal proportional to the line voltage waveform $v_S$ to produce the reference current signal $i_{L,ref}$. Afterward, a current-mode controller 26 is used to generate the on and off signal to the switch 28 shaping the current waveform of the inductor 11. Therefore, the average waveshape of the line current is forced to follow the waveform of the line voltage.

FIG. 2(b) depicts the current waveform of the converter. It can be observed that the switching frequency of the PFC converter must be many times higher than the frequency of the AC system. The typical operating frequency of a modern PFC converter is in the range of 20 to 40 kHz which is over 100 times higher than the frequency of the AC system. Using a 400 kHz WPT system as an example, applying this current-shaping technology implies that the switch 28 has to operate at 40 MHz. In fact, when the switching frequency approaches tens of megahertz, the switching loss becomes significance and the efficiency of the converter is sharply reduced. The converter also has a number of other problems and limitations, including parasitic inductance and capacitance of the interconnections, stray inductances of the magnetic components, and parasitic and junction capacitances of the semiconductor diodes and switches. The EMI, thermal, insulation and isolation problems of the converter are not easy to solve individually. Hence, the conventional current-shaping PFC technology is not suitable for high frequency ac system since the fundamental frequency is already in the range of hundreds of kilohertz to a few megahertz.

SUMMARY OF THE INVENTION

This invention provides an electronic apparatus and control method for high frequency AC to DC conversion. Based on the resonant technique, the line current is shaped to be sinusoidal and is forced to follow the line voltage. Hence, the input side AC power factor of the converter is close to unity. With the proper selection of the characteristic impedance of the resonant tank, the converter is able to perform the function of a buck, boost or buck-boost converters. The initial condition of the resonant tank is used to control the output voltage gain of the converter. Since all the switches are operated at the fundamental frequency of the input AC source, the switching losses of the converter are small. A control scheme is also proposed for the converter. It can be realized by simple operational amplifiers and digital logic gates that can be easily fabricated into a single integrated circuit (IC) for mass production. The distinctive features of this invention are favorable for the high frequency AC to DC conversion including inductive/capacitive wireless/contactless power transfer system.

The present invention provides a solution for high frequency AC to DC conversion with power factor correction. The distinctive features of this new invention are summarized as follow:

With the use of a resonance technique, the AC line current is shaped to be sinusoidal and the AC power factor of the converter is near unity.

The output voltage gain of the converter can be controlled above or below the AC line voltage.

All the semiconductor devices are operated at a constant frequency which is equal to the frequency of the AC source.

The control scheme can be realized by simple analog and digital circuits which is favorable for integrated circuit (IC) fabrication.

BRIEF DESCRIPTION OF THE DRAWINGS

The foregoing and other features of the present invention will be more readily apparent from the following detailed description and drawings of an illustrative embodiment of the invention in which:

FIG. 6(a) shows the waveforms for the circuit of FIG. 5(b), and FIGS. 6(b)-6(e) show the four states of the circuit of FIG. 5(b) during an input ac voltage cycle;

FIG. 7(b) shows a detail of the phase detector in FIG. 7(a) and FIG. 7(c) shows a detail of the pulse width modulation (PWM) generator in FIG. 7(a);

DESCRIPTION OF AN ILLUSTRATIVE EMBODIMENT OF THE INVENTION

Figure 1:
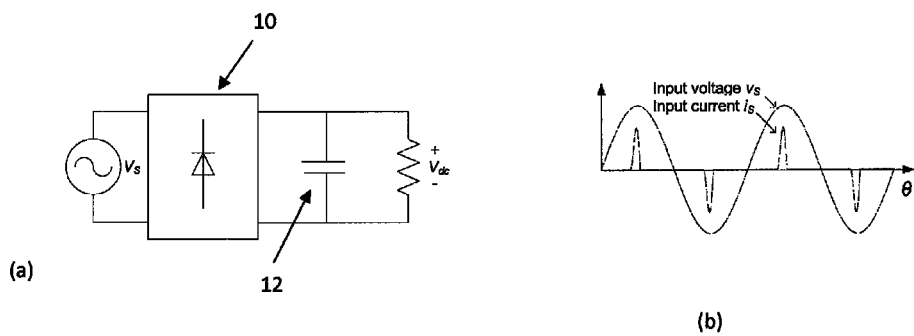
FIG. 1(a) is a schematic of a prior art simple diode rectifier with an output storage capacitor and FIG. 1(b) shows the input voltage and current waveforms for the circuit of FIG. 1(a)
Figure 2:
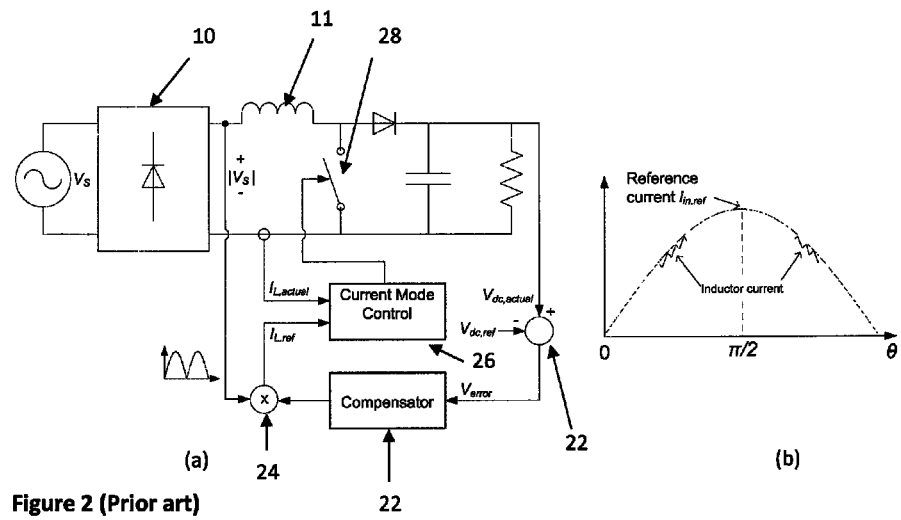
FIG. 2(a) is a schematic of a prior art power factor correction circuit and FIG. 2(b) shows the input voltage and current waveforms for the circuit of FIG. 2(a)
Figure 3:
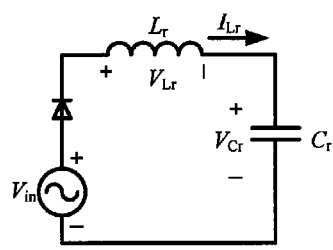
FIG. 3 shows a half wave rectifier with an inductive-capacitive load.
Figure 4:
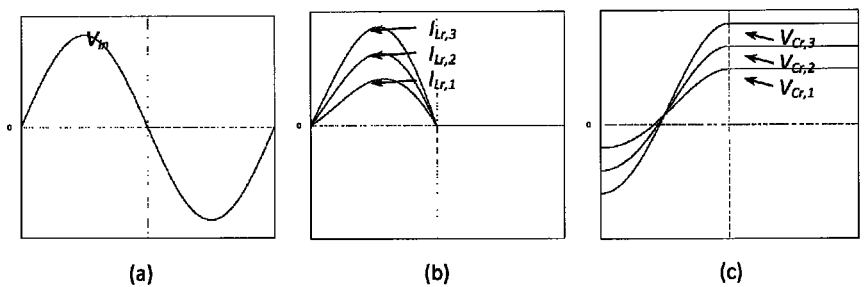
FIG. 4(a) shows the input voltage of the circuit of FIG. 3.
FIG. 4(b) shows the current in the inductor of FIG. 3
FIG. 4(c) shows the voltage on the capacitor of FIG. 3.

According to the present invention, a new concept is proposed to realize high frequency AC to DC conversion with input AC side power factor correction (PFC) and output DC voltage regulation. Considering a half wave rectifier with an inductive-capacitive (LC) load as shown in FIG. 3. The voltage source $V_{in}$ is ac and its angular frequency is $\omega$. A LC load is selected such that its angular resonance frequency $\omega_r=1/(2\pi\sqrt{L_rC_r})$ is equal to the angular frequency of the source. For the positive half-cycle of the source in this circuit, the diode is forward biased. The current produced by the LC resonance will be forced into a sinusoidal form. The power flow is controlled by the characteristic impedance $Z_r=\sqrt{L_r/C_r}$ and the initial condition of the capacitor $V_{Cr,0}$. FIGS. 4(a)-4(c) depict the input voltage and corresponding current and voltage waveforms, respectively, of the rectifier under different initial values of the capacitor. For the negative half-cycle of the source, the diode is reverse biased, making the current zero. The energy stored in the capacitor $C_r$ must be dissipated in a resistive load. Hence the rectifier is effective at the next positive half-cycle.

Figure 5A:
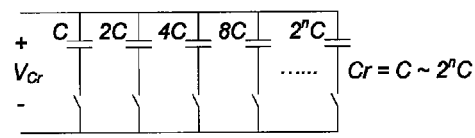
FIG. 5(a) shows a switched capacitor bank with a binary-weighted structure and FIG. 5(b) shows the ac to dc converter of the present invention with switched LC circuits.

FIG. 5(a) depicts a switched capacitor bank for changing the capacitance. The value of an individual capacitor can be arranged in a binary-weighted structure. The angular resonant frequency $\omega_r$ of the LC load can be dynamically changed by controlling the switches.

Figure 5B:
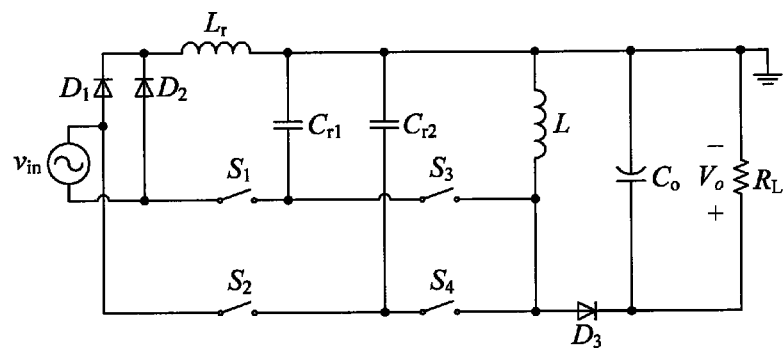

FIG. 5(b) shows the proposed high frequency AC to DC converter with a sinusoidal input voltage source $v_{in}$. For simplicity, the diodes and switches are considered ideal. The inductor L and output capacitor $C_o$ are assumed sufficiently large, which result in a constant current and output voltage $V_o$ under steady-state. During the positive half-cycle of the source, the switches $S_1$ and $S_4$ conduct together. Conversely, the switches $S_2$ and $S_3$ conduct together in the negative half-cycle. The diodes $D_1$ and $D_2$ cannot be on at the same time.

The capacitor $C_{r1}$ and $C_{r2}$ serve as the function of storing and transferring energy from the input to the output. The operating states and corresponding waveforms of the converter are shown in FIGS. 6(a)-6(e).

A. Operating Principle

State 1 ($0 < t \leq t_1$), FIG. 6(b): Prior to turning the switches $S_1$ and $S_4$ on, the capacitor $C_{r1}$ and $C_{r2}$ are assumed to be charged to $V_{Cr,min}$ and $V_{Cr,max}$, respectively. The positive half-cycle begins at t=0. The switches $S_1$ and $S_4$ are turned on. FIG. 6(b) The input voltage $v_{in}$, inductor $L_r$ and capacitor $C_{r1}$ are connected in series to form a series resonance circuit. The increasing of $v_{in}$ causes $D_1$ to conduct. The input current $i_{in}$ is forced into a sinusoidal form. The $L_r$ and $C_{r1}$ together determine the angular resonance frequency $\omega_r$ of the converter which is equal to the angular frequency of the voltage source. The inductor L is sufficiently large such that the current $I_L$ can be assumed to be a constant magnitude. Thus, the capacitor $C_{r2}$ discharges into the inductor L and the capacitor voltage linearly drops to zero. Hence, $C_{r2}$ is charged to $V_{Cr,min}$ by the inductor L. In this time period, the output capacitor $C_o$ delivers energy to the output load resistor $R_L$.

State 2 ($t_1 < t \leq t_2$, FIG. 6(c)): At $t=t_1$, the capacitor $C_{r2}$ has been charged to $V_{Cr,min}$. The switch $S_4$ is turned off. FIG. 6(c) The current of the inductor L flows to the output capacitor $C_o$ and load resistor $R_L$ through the diode $D_3$. At $t=t_2$, inductor current $I_{Lr}$ returns to zero, the capacitor $V_{Cr1}$ is charged from $V_{Cr,min}$ to $V_{Cr,max}$. The switch current $S_1$ is commutated off naturally and the gate/base drive from the switch should be removed at this point. The negative cycle begins.

State 3 ($t_2 < t \leq t_3$, FIG. 6(d)): In the negative half-cycle of $v_{in}$, the switches $S_2$ and $S_3$ are turned on. The negative part of waveform is similar to the positive half-cycle. The inductor $L_r$ and capacitor $C_{r2}$ are connected in series to form a series resonance circuit shaping the input current into a sinusoidal form. Energy is transferred from the input source $v_{in}$ to capacitor $C_{r2}$. In the meantime, the energy stored in $C_{r1}$ is transferring to the inductor L. Similarly, the load is supplied by the output capacitor $C_o$.

State 4 ($t_3 < t \leq t_4$): At $t=t_3$, switch $S_3$ is turned off when the voltage of $C_{r1}$ is equal to $V_{Cr,min}$. Energy stored in L feeds to the output capacitor $C_o$ and load resistor $R_L$. When the source voltage again becomes positive at $t=t_4$, switch $S_2$ is turned off and switches $S_1$ and $S_4$ are turned on again. The positive part of the waveform is repeated.

B. Control of the Converter

Figure 7A:
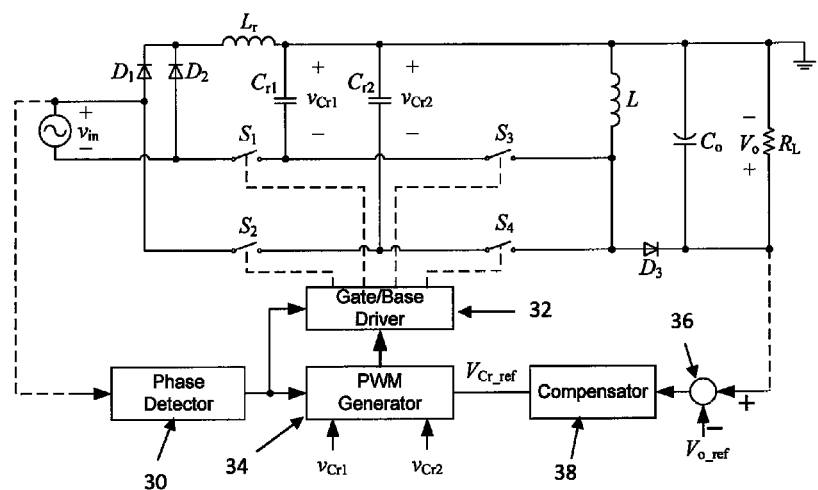
FIG. 7(a) shows the circuit of FIG. 5(b) with a switch control.
Figure 7B:
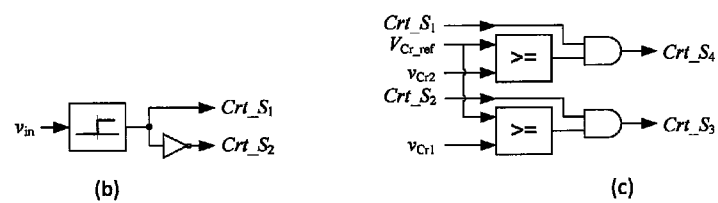

The method that can provide control for the converter is described in FIGS. 7(a)-7(c), which depict a simplified control block diagram that generates control signals for the converter in order to regulate the output dc voltage $V_o$. The ac source voltage $v_{in}$ is sensed as a feedback signal applied to phase detector circuit 30. The phase detector circuit is a comparator which derives the phase information of the ac source as shown in FIG. 7(b). The phase information is applied to the gate/base driver circuit 32 to control the on/off time of the switches $S_1$ and $S_2$ so they follow the ac source frequency. The outputs of the phase detector 30 are also applied to the Pulse-Width Modulation (PWM) generator 34 to derive the control signals for switches $S_3$ and $S_4$. The instantaneous output voltage $V_o$ of the converter is sensed and subtracted in circuit 36 from the reference voltage $V_{o\_ref}$ to determine the error. The error signal is applied to a compensator 38 to generate the reference voltage $V_{Cr\_ref}$ for the resonant capacitors $C_{r1}$ and $C_{r2}$. FIG. 7(c) shows that the instantaneous voltages of the resonant capacitors $C_{r1}$ and $C_{r2}$ are sensed and compared to the reference voltage $V_{Cr\_ref}$ in the PWM generator 34 which sets the pulse width of the switches $S_3$ and $S_4$.

In FIG. 7(a) the diodes $D_1$, $D_2$, switches $S_1$, $S_2$, and reactance $L_r$, $C_{r1}$ and $C_{r2}$ act as a ac-dc power factor correction circuit of the input ac voltage $V_{in}$ to generate a current $i_{Lr}$ as shown in FIGS. 6(a)-(e). The switches $S_3$ and $S_4$, diode $D_3$, output inductor L and output capacitor $C_o$ form a dc-dc power converter to regulate the output voltage $V_o$.

Figure 8:
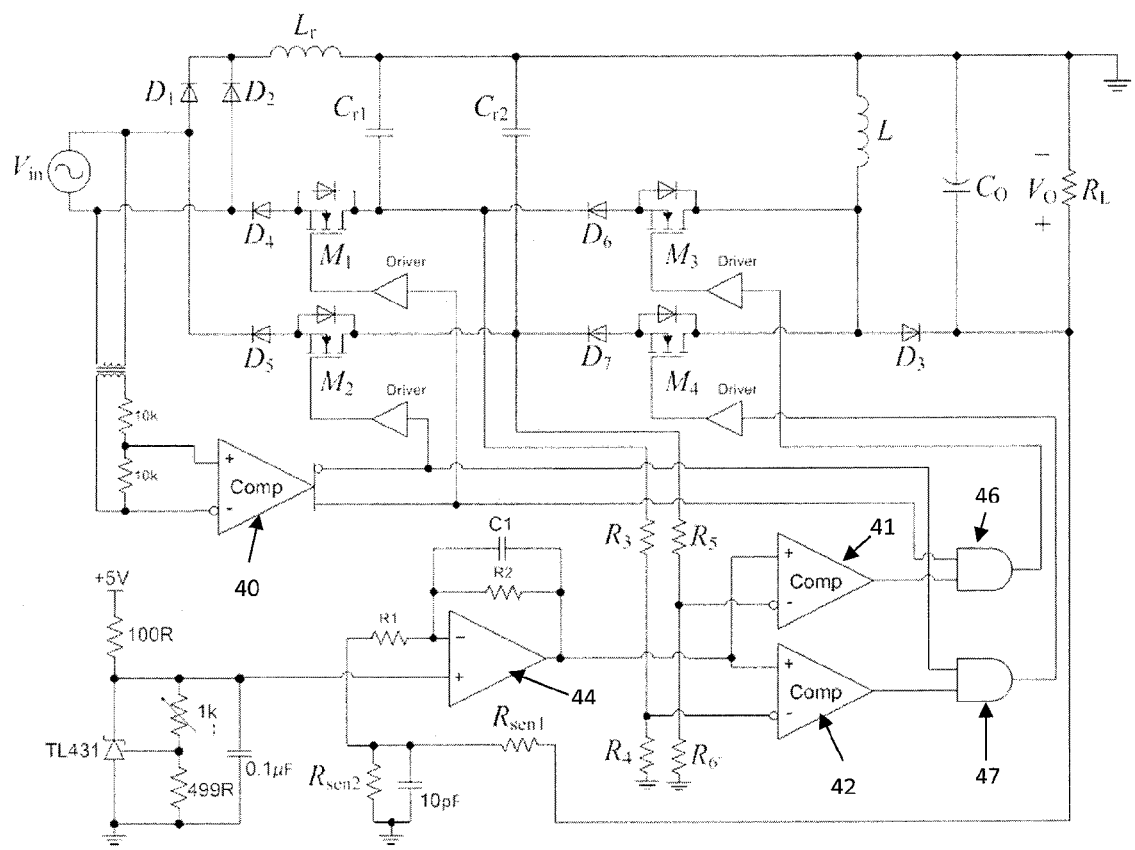
FIG. 8 is a schematic diagram of an integrated circuit form of the circuit of FIG. 7(a)

An example of the realization of proposed high frequency AC to DC converter using metal-oxide-semiconductor field-effect transistor (MOSFET) is shown in FIG. 8. The control circuit is implemented by discrete components including analog comparators 40-42, operational amplifier 44 and logic gates 46, 47. To verify the advantage of the present invention, a simulation study was conducted. Table 1 summarizes the specification of the converter.

TABLE 1

| Converter Specifications. Converter Specifications | |
|---|---|
| Input AC voltage | 50 Vpeak |
| Input AC frequency | 500 kHz |
| Output DC voltage | 100 V |
| Output DC power | 100 W |
| Resonant Tank Inductor $L_r$ | 10.132 µH |
| Capacitor $C_{r1}$, $C_{r2}$ | 10 nF |
| Main Inductor L | 3.236 mH |
| Output Capacitor $C_o$ | 1.092 µF |

Figure 9:
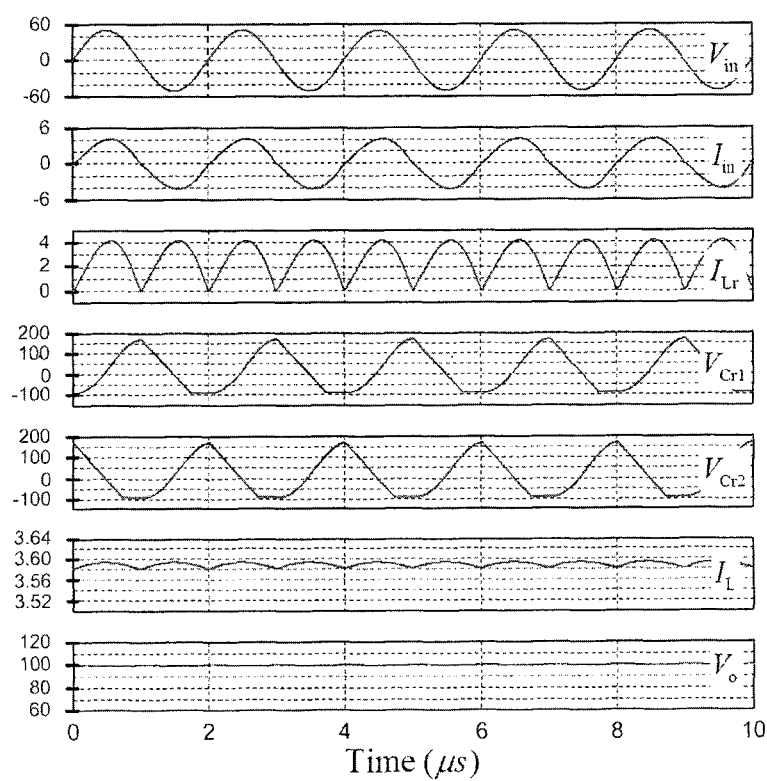
FIG. 9 are simulated waveforms for the circuit of FIG. 8.
Figure 10:
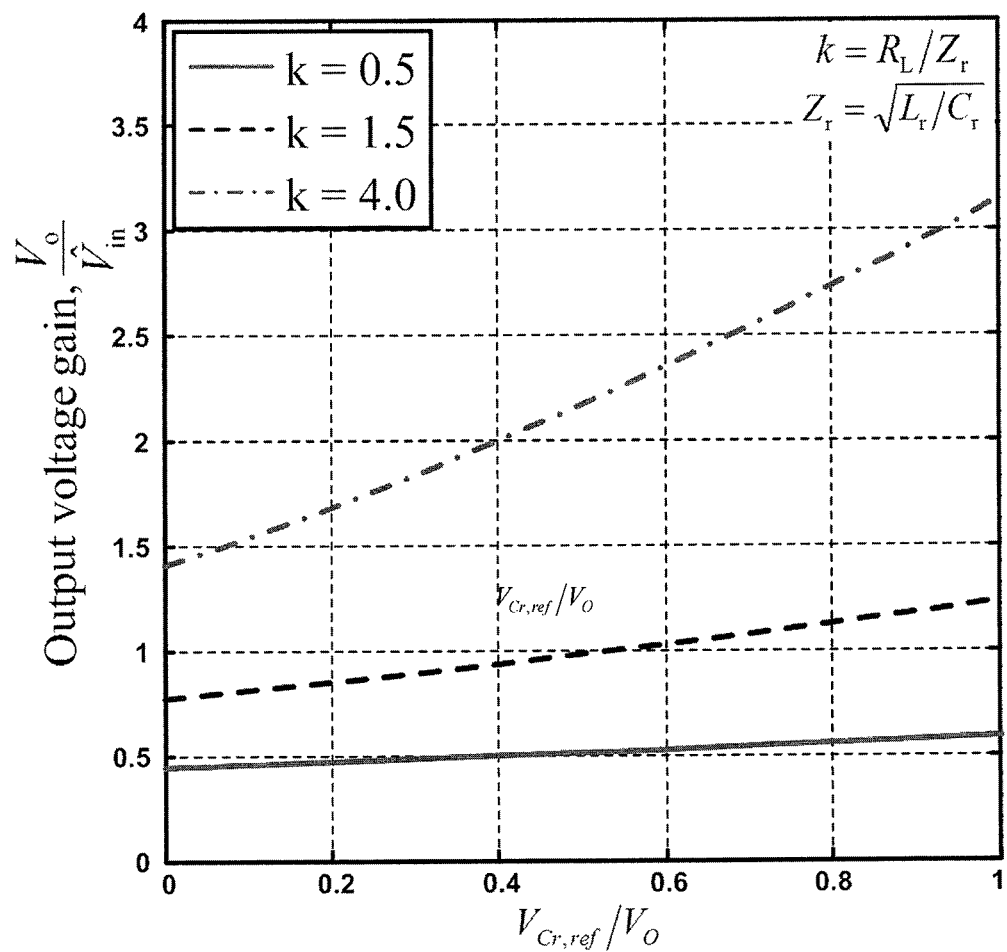
FIG. 10 is a graph of the output voltage gain versus normalized control voltage for the circuit of FIG. 8.

FIG. 9 shows the simulated voltage and current waveforms of the converter by simulation. The voltage conversion ratio against the control voltage $V_{Cr\_ref}$ is plotted in FIG. 10. It can be observed that the output voltage of the proposed converter can be less than that of the AC source or greater than the AC source depending on the k value and control voltage $V_{Cr\_ref}$.

While the present invention has been particularly shown and described with reference to a preferred embodiment thereof, it will be understood by those skilled in the art that various changes in form and details may be made therein without departing from the spirit and scope of the invention. The invention is not limited by this description, but only by the appended claims.

What is claimed is:

1. A high-frequency ac-dc power converter with an input ac signal and an output dc signal, comprising:
   at least two front-end rectifier diodes arranged as a full wave rectifier of the input ac signal,
   a first inductor with an input connected to the output of the full wave rectifier and an output connected to one end of a load for the converter,
   an output capacitor connected across the load for the converter,
   at least one additional inductor and one additional capacitor have one end connected to the junction between the first inductor and the load,
   a switching circuit connected to the other ends of the additional inductor and capacitor for selectively forming different (LC) resonant circuits with the inductors and capacitors during predetermined parts of a cycle of the input ac signal to form a ac-dc power converter.

2. A high-frequency ac-dc power converter according to claim 1 wherein the LC resonant circuits are tuned to the frequency of the input voltage.

3. A high-frequency ac-dc power converter according to claim 1 wherein the capacitors of the LC resonant circuits are constructed by a switched capacitor bank and the resonant frequency is changed by controlling the switches of the capacitor bank.

4. A switched capacitor bank according to claim 3 wherein the value of the capacitors is arranged in a binary-weighted structure.

5. A high-frequency ac-dc power converter according to claim 1 wherein a switch S1 is turned on for the positive half cycle of the input ac signal and a switch S2 is turned on for the negative half-cycle thereof.

6. A high-frequency ac-dc power converter according to claim 1 wherein the connection of the LC resonant circuits and the dc-dc power converter is achieved by the control of a switch S4 for the positive half cycle of the input ac signal and a switch S3 for the negative half cycle thereof.

7. A high-frequency ac-dc converter 1 with an input ac signal and an output dc signal, comprising:
   at least two front-end rectifier diodes arranged as a full wave rectifier of the input ac signal,
   a first inductor with an input connected to the output of the full wave rectifier and an output connected to one end of a load for the converter,
   an output capacitor connected across the load for the converter,
   at least one additional inductor and one additional capacitor,
   a switching circuit for selectively forming different (LC) resonant circuits with the inductors and capacitors during predetermined parts of a cycle of the input ac signal to form a ac-dc power converter; and
   wherein the switching circuit comprises switches and a control for controlling the opening and closing of the switches, said control including a phase detector that detects the phase of the input ac signal, a PWM generator that drives the switching based on the phase of the input ac signal, and an output feedback loop with a compensator whose input is the difference between the output voltage and a reference, said compensator affecting the PWM generator operation.

8. A high-frequency ac-dc converter with an input ac signal and an output dc signal, comprising: at least two front-end rectifier diodes arranged as a full wave rectifier of the input ac signal, a first inductor with an input connected to the output of the full wave rectifier and an output connected to one end of a load for the converter, an output capacitor connected across the load for the converter, at least one additional inductor and one additional capacitor, a switching circuit for selectively forming different (LC) resonant circuits with the inductors and capacitors during predetermined parts of a cycle of the input ac signal to form a ac-dc power converter; and
   wherein the switching circuit comprises switches and a control for controlling the opening and closing of the switches, said control including a phase detector that detects the phase of the input ac signal, a PWM generator that drives the switching based on the phase of the input ac signal, and an output feedback loop with a compensator whose input is the difference between the output voltage and a reference, said compensator affecting the PWM generator operation.

9. A high-frequency ac-dc power converter with an input ac signal and an output dc signal, comprising:
   at least two front-end rectifier diodes arranged as a full wave rectifier of the input ac signal,
   a first inductor with an input connected to the output of the full wave rectifier and an output connected to one end of a load for the converter,
   an output capacitor connected across the load for the converter,
   at least one additional inductor and one additional capacitor, a third diode connected in series with the at least one additional inductor across the load, a switching circuit for selectively forming different (LC) resonant circuits with the inductors and capacitors during predetermined parts of a cycle of the input ac signal to form a ac-dc power converter wherein the at least one additional capacitor is first and second capacitors with ends connected together and to the output of the first inductor, the other end of the first capacitor being connected through a switch S1 of the switching circuit to a negative terminal for the input ac signal and the other end of the second capacitor being connected through a switch S2 of the switching circuit to a positive terminal for the input ac signal, wherein a switch S3 of the switching circuit is connected from the additional inductor where it connects to the third diode to the first capacitor where it connects to the switch S1 and a switch S4 of the switching circuit is connected from the additional inductor where it connects to the third diode to the second capacitor where it connects to the switch S2, and wherein the switching circuit operates to close switches S1 and S4 and opens switches S2 and S3 during most of the positive cycle of the input ac signal, further opens switch S4 during the remaining portion of the positive cycle, closes switches S2 and S3 and opens switches S1 and S4 during most of the negative cycle of the input ac signal and further opens switch S3 during the remainder of the negative cycle of the input ac signal.

10. A high-frequency ac-dc power converter according to claim 9 wherein the opening and closing of switches is achieved with the use of a phase detector that detects the phase of the input ac signal, a PWM generator that drives the switching based on the phase of the input ac signal, and an output feedback loop with a compensator whose input is the difference between the output voltage and a reference, said compensator affecting the PWM generator operation.

* * * * *